(No Model.)
W. H. HOPKINS.
COFFEE OR TEA POT.
No. 346,044. Patented July 20, 1886.
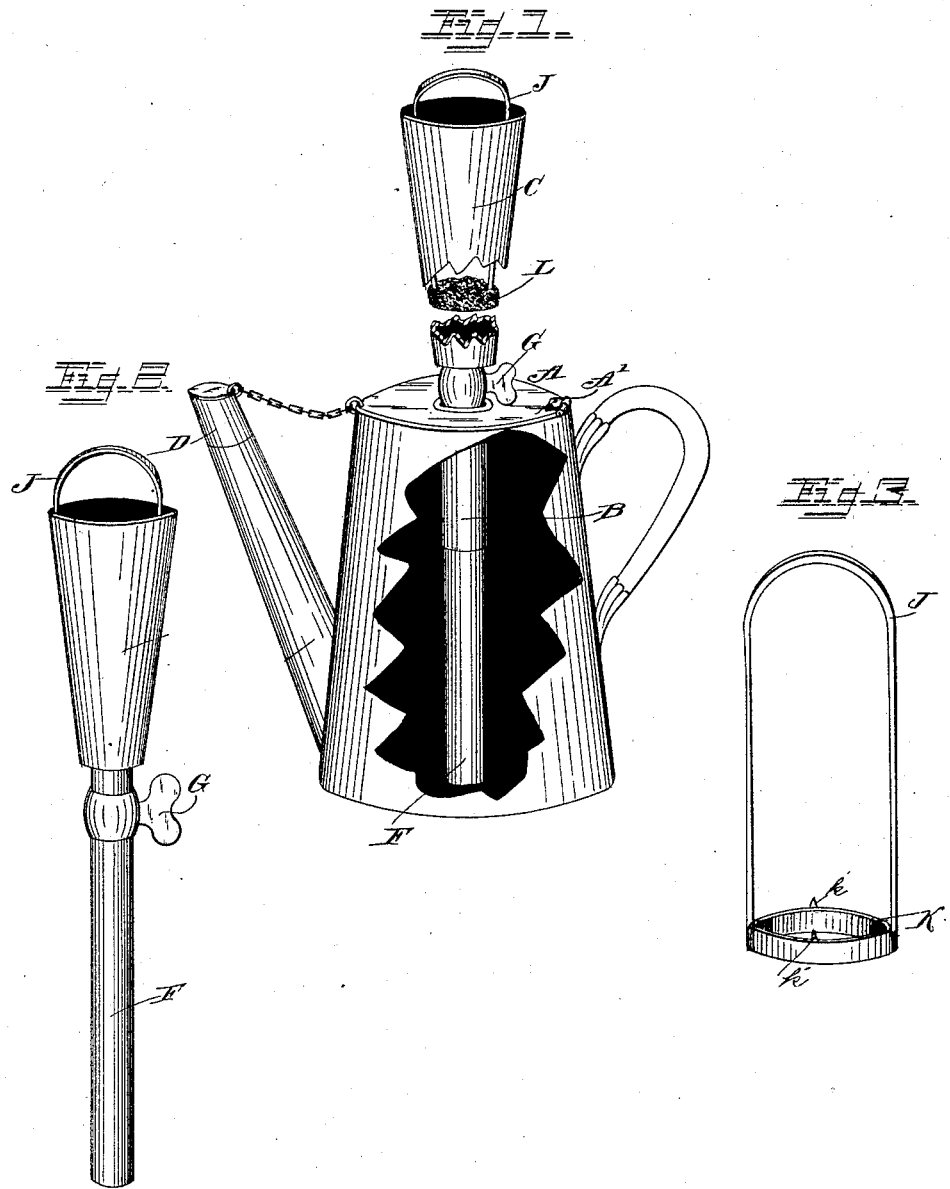
WITNESSES.
INVENTOR.
William H. Hopkins
By Myers & Co.
ATTORNEYS.
N. PETERS, Photo-Lithographer, Washington, D. C.

United States Patent Office.

WILLIAM HARISON HOPKINS, OF SODUS, NEW YORK, ASSIGNOR OF ONE-HALF TO FRANK D. GAYLORD, OF SAME PLACE.

COFFEE OR TEA POT.

SPECIFICATION forming part of Letters Patent No. 346,044, dated July 20, 1886.

Application filed October 9, 1885. Serial No. 179,420. (No model.)

*To all whom it may concern:*

Be it known that I, WILLIAM HARISON HOPKINS, a citizen of the United States of America, residing at Sodus, in the county of Wayne and State of New York, have invented certain new and useful Improvements in Coffee or Tea Pots, of which the following is a specification, reference being had therein to the accompanying drawings.

My invention is an improvement in coffee or tea pots; and it consists in the peculiar construction, combination, and arrangement of the parts of the device for preventing escape of the aroma of the coffee or tea, and preventing the slightest particle of the grounds thereof from intermingling with the drinking fluid, substantially as hereinafter more fully shown and described.

In the accompanying drawings, Figure 1 is a view in perspective with parts broken away to show the interior structure of my coffee or tea pot, and Figs. 2 and 3 are detail views thereof.

The object of my invention is to provide means for preparing for table use coffee and tea in such a manner as to extract therefrom the more volatile parts which comprise the aroma while excluding therefrom tannin, and preventing that absence of fragrance which is superinduced by boiling.

In its construction I employ pot A, having a centrally-orificed cover, A', wherein is soldered and rigidly secured tube B, which tube is closed when the extractor C is removed to prevent escape of the aroma by means of spout-cap D. Tube B is of diameter sufficient to admit tube F of extractor C, and hence when tube F is therein inserted the tube and extractor are securely held in a vertical position. The extractor C is a cylindric vessel gradually enlarged from its base upward, and opening at bottom into tube F, (to which it is rigidly secured,) which tube is opened and closed by means of stop-cock G. Cock G thus serves as a means of retaining in and admitting outflow of the fluid contained in extractor C. The filter J for retaining the coffee or tea has secured thereto at its mouth by any ordinary means a metallic band, K, which is adapted as to size to a point near the inner lower end of the extractor. The filtering material ordinarily consists of two similar pieces of white flannel having inserted between them a corresponding piece of bolting-cloth; but when large urns are employed in lieu of smaller vessels for making a greater quantity of the beverage for hotels, &c., heavy felt is employed as a substitute for the flannel. To the metallic band K the cloth is secured by means of small pointed hooks $k$, by means of which the filtering cloth or material is securely held in position. Prior to the placing of the filter J in the extractor the filtering material is first secured around the band K and on hooks $k$.

Thus constructed when the beverage is sufficiently acted upon the cock G is turned to admit its flow through tube F into pot A, and when the fluid has all descended the orifice in the pot-cover is closed with cap D, and escape of the lighter and more volatile parts of the beverage is thus prevented, which cannot be effected when the tea or coffee is subjected to a more gradual boiling operation after the ordinary method.

Having thus fully described my invention, what I claim, and desire to secure by Letters Patent, is—

1. The combination, with the coffee or tea pot having a centrally-orificed cover, and the tube secured thereto, of the extractor having the tube extending downward therefrom, and the filter inserted in said extractor, substantially as shown and described.

2. The combination, with a coffee or teapot having the spout B, of the lid or cover having a central orifice, a tube secured thereto, and the cap fitting the outer end of the spout and the orifice in the cover, substantially as shown and described.

In testimony whereof I affix my signature in presence of two witnesses.

WILLIAM HARISON HOPKINS.

Witnesses:
C. N. McKOON,
C. H. MYERS.